United States Patent

[11] 3,554,449

| | | | |
|---|---|---|---|
| [72] | Inventor | Adam Currie | |
| | | Huntingdon, Pa. | |
| [21] | Appl. No. | 786,234 | |
| [22] | Filed | Dec. 23, 1968 | |
| [45] | Patented | Jan. 12, 1971 | |
| [73] | Assignee | Prismo Universal Corporation | |
| | | Huntingdon, Pa. | |
| | | a corporation of Delaware. by mesne assignments | |

[54] PORTABLE PLASTIC MELTER
8 Claims, 1 Drawing Fig.

[52] U.S. Cl............................................... 239/135,
239/130; 18/8; 94/42; 118/302; 126/343.5;
165/107; 222/146
[51] Int. Cl............................................... B05b 1/24
[50] Field of Search............................................ 222/146;
239/128, 130X, 135—139; 118/302; 126/343.5;
94/42; 165/107; 18/8, 12

[56] References Cited
UNITED STATES PATENTS

| 2,295,942 | 9/1942 | Fields...................... | 18/8X |
| 2,439,367 | 4/1948 | Middlestadt............... | 126/343.5 |
| 2,548,177 | 4/1951 | Tauber....................... | 126/343.5 |
| 2,762,652 | 9/1956 | Carter........................ | 165/107X |
| 3,036,335 | 5/1962 | Heston et al................ | 18/12 |
| 3,047,541 | 7/1962 | Ryffel et al. .............. | 18/8X |
| 3,113,843 | 12/1963 | Li.............................. | 18/8X |

FOREIGN PATENTS

| 755,158 | 8/1956 | Great Britain............... | 126/343.5 |

*Primary Examiner*—Albert W. Davis, Jr.
*Attorney*—Karl W. Flocks

ABSTRACT: A portable plastic melter is provided for melting large or small amounts of thermoplastic material containing glass beads or other aggregate without permitting settling of the aggregate. This is accomplished by heating the composition to an intermediate temperature sufficient to provide the plastic with a high viscosity (mushy state) so that the plastic is capable of flowing by gravity but without permitting the aggregate to settle; and then, immediately prior to spraying the plastics from a suitable nozzle such as onto a road surface for the provision of a traffic line, superheating the material very quickly up to a temperature sufficiently high so that the viscosity drops rapidly thereby permitting such spraying without aggregate settling.

PATENTED JAN 12 1971    3,554,449
INVENTOR
ADAM CURRIE
BY
*Kerry U. Focks*
ATTORNEY
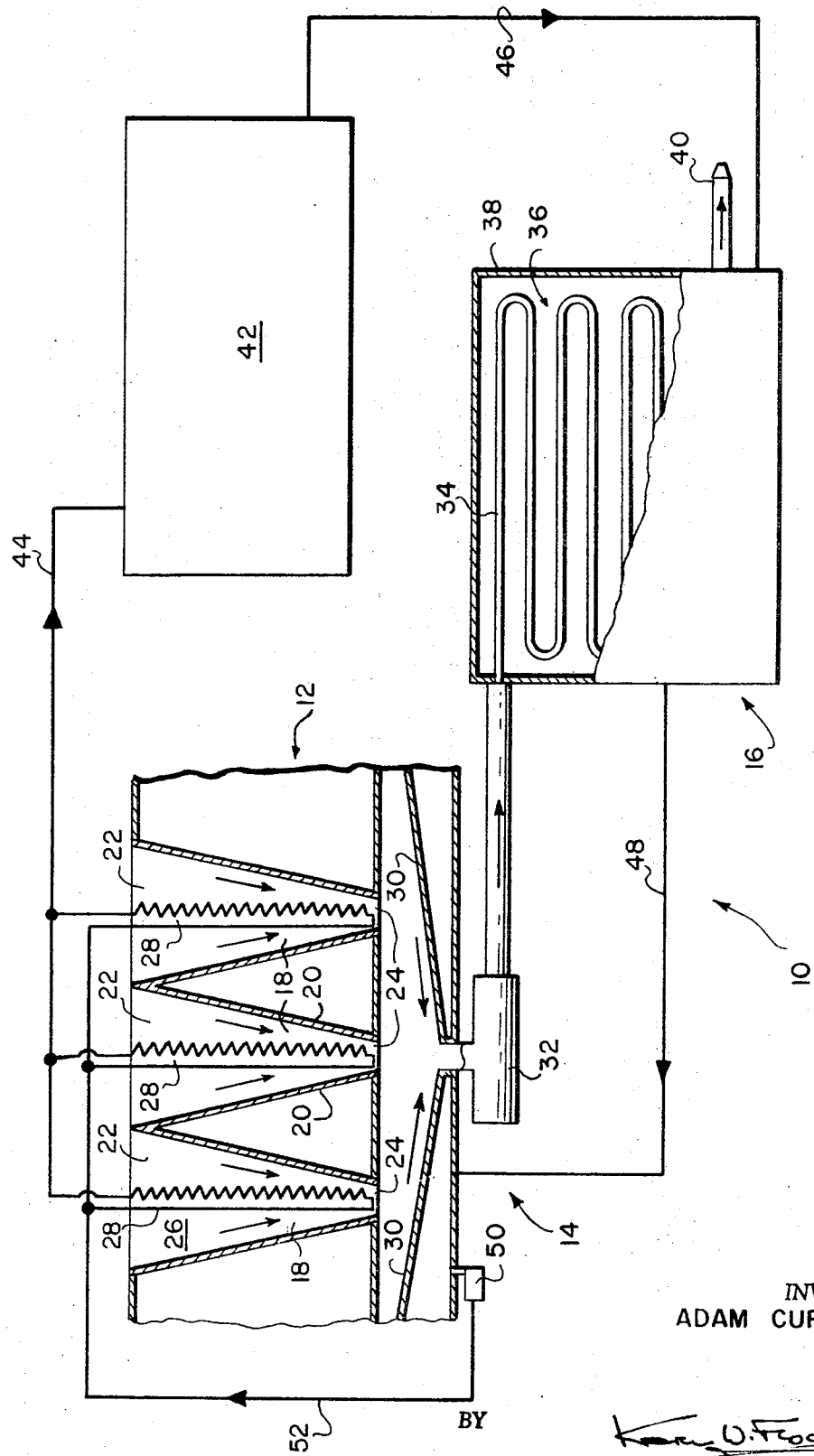

PORTABLE PLASTIC MELTER

The present invention relates to a portable plastic melter and, more particularly, to a device which may be carried on a truck which is capable of melting the plastic in a plastic-aggregate composition so that the viscosity may be greatly reduced without the aggregate settling.

Until the present time, it has been conventional in truck-carried highway line spraying equipment (utilizing a thermoplastic binder for the highway paint) to provide a plastic melter which uses a melt tank surrounded by a hot oil system. Such a melting system is apt to provide nonuniform temperature throughout the mass thereby causing a viscosity gradient which parallels the nonuniform temperature gradient. Such temperature and viscosity gradients throughout the molten mass causes movement and nonuniform distribution, particularly settling, of the glass beads (or other aggregate) which should be maintained uniformly distributed throughout the plastic material.

This may be seen by the fact that in the areas of high viscosity there is greater resistance to flow and vice versa so that where temperature gradients exist flow occurs tending to destroy the uniformity of distribution of the glass spheres. One attempted procedure for solving this problem has been to constantly stir the molten mixture, but this in turn has two defects of its own: (1) the stirring causes vortexes which provides pressure gradients; such pressure gradients also contribute to regions of high and low viscosity thereby creating in certain instances the very problem which the stirring seeks to solve. (2) In addition, stirring requires a great deal of energy, particularly in the viscous masses under consideration, and this is commercially undesirable.

It is, accordingly, an object of the present invention to obviate the deficiencies of the prior art, such as indicated above.

It is another object of the present invention to provide a device capable of melting large and small amounts of thermoplastic material in the quickest possible time without permitting settling of the aggregate contained in the thermoplastic material.

It is another object of the present invention to provide a device which has the advantages of instantaneous and continuous melting; elimination of down time required by conventional melters; and has the safety feature of obviating the necessity of transferring hot material from melter to striping unit in the provision of highway stripes by spraying a molten thermoplastic composition.

These and other advantages of the instant invention will be more apparent from the following description, it being understood that the embodiments disclosed are offered illustratively.

In the melting of thermoplastic compositions such as tar and bitumen, experiments have shown that when the material comes in contact with a hot surface, rapid melting occurs; furthermore, the melting capacity of the hot surface is a function of both the area of the surface and the temperature of the surface. If plastic material is placed on a hot horizontal surface, good melting characteristics may prevail but the flow conditions of the fluid material will be poor and aggregate material contained therein will settle out and remain on the horizontal surface.

If the hot surfaces take the form of a rectangular or round vessel (containing plastic material), or if the hot surfaces take the form of an immersion heater in such a rectangular or round vessel, there is a tendency for the material to slump and lose contact with the hot surface thereby greatly reducing the melting capacity. Also, these arrangements provide only a small amount of contact between the material and the hot surface, thereby requiring that the majority of the heat transfer by convection of the heated material and conduction through the heated material, this combination providing slow heating.

On the other hand, it has now been found that if a hot surface is placed vertically in a vessel having sloping sidewalls with a control orifice at the bottom below the hot surface, then over 90 percent of the material will contact the hot surface and rapid melting will occur. If the angle between the vertical hot surface and the inclined sidewall of the container is kept between the limits of 10° and 30°, then good melting and good flow conditions are obtained. The practical minimum of 10° is necessary for capacity purposes while the 30° maximum slope is desirable to maintain good flow conditions.

In theory, a particle of material contacting any point of the hot surface at a given vertical position will be at the same temperature as all other particles contacting the hot surface; accordingly, a melted film is formed which will flow out the control orifice at the bottom of the sloped wall container. Material will continue to flow out since a succession of flowing films will be developed. The viscosity of such films will be a function of their temperature and this temperature can be controlled by the temperature of the hot vertical surface. It is therefore possible to maintain a viscosity that will maintain the aggregate in suspension, thereby eliminating the need for stirring. By this system it becomes possible to melt different materials at different temperatures without settling of aggregate, merely by controlling the temperature of the heated vertical surface overlying the control orifice in the sloped wall container as a function of the temperature - viscosity properties of the particular thermoplastic in question.

Because the material leaving the bottom control orifice of the sloped wall container by gravity is highly viscous (in mush form), it is not sprayable because of such high viscosity. For this reason, more heat must be added and this is preferably accomplished by pumping the material through a superheater at a sufficiently high rate (velocity of flow) to maintain the aggregate in suspension.

The nature and further advantages of the instant invention will be more apparent from the following more detailed description taken in conjunction with the drawing, wherein:

The sole figure illustrates, partially and schematically, an embodiment of the present invention.

A portable plastic melter 10 is provided which may be carried by a truck and is primarily intended for use in the spraying of highway traffic lines, for resurfacing highways, or for jointing, in connection primarily with roads, but also with paths or other small surface areas. The portable plastic melter 10, in the embodiment shown, comprises three portions, a preheater hopper portion 12, a transfer portion 14 and a superheater portion 16.

The preheater portion 12 of the plastic melter preferably comprises a series of hoppers 18 in parallel having sloping sidewalls 20 preferably inclined at an angle to the vertical of 10° to 30° and end walls 26. Each hopper 18 is provided with a large opening 22 at the top for receiving the composition to be melted, and a small opening or control orifice 24 at the bottom through which the mushy composition is discharged after having been heated in the hopper 18.

The precise configuration of each hopper 18 is not essential; however it is preferred that the two opposite sidewalls 20 be sloped as shown and that the end walls 26 connecting the two sidewalls 20 be vertical so that the control orifice 24 defines a slot opening extending perpendicular to the plane of the drawing. Alternatively, each hopper 18 may comprise a single frustroconical sidewall 20, or there may be a plurality of sloping sidewalls 20 thereby defining the frustum of a pyramid. Alternatively, only one sloping sidewall 20 of planar configuration could be used.

Each hopper is provided with a suitable heating means 28 shown schematically. As pointed out above, it is important that the means to apply heat be aligned generally vertically in the hopper 18 above the orifice 24. In the preferred form of the hopper 18 wherein the control orifice 24 is a slot, the heater 28 forms a vertical plate overlying the slot 24. Where the hopper 18 is frustroconical, the heating means 28 may be a vertical pipe overlying the round control orifice 24. While the heating means 28 preferably passes down through the center of the hopper 18 as shown, it may also act through one of the sidewalls 20 or end walls 26 in which case (if a sidewall) the heating means 28 will not be aligned absolutely vertically but will be inclined at an angle of 10—30°. Where a simplified construction is used having only one flat sloping sidewall 20, the heating means may advantageously form the opposite vertical wall. In any event, a diminishing volume of plastic material will face the heating means 28 from the top of the hopper 18 to its bottom.

Whereas the illustrated embodiment shows the heating means to comprise a fluid heat exchanger wherein hot fluid passes through the heating means 28 continuously and exchanges its sensible heat to the walls of the heating means 26, it will be understood that any system of heating may be used, such as an electrical heater incorporated in the generally vertical heating means 28. It should also be understood that while the precise external form of the heating means 28 may vary, there should be no horizontal protuberances on the outside surface thereof, which, in the preferred embodiment, merely comprises on the outside a flat plate.

Located beneath the discharge orifice 24 of the preheater 18 is the transfer portion 14 of the device 10 and this preferably merely comprises an inclined plate 30 which is heated from below and a pump 32 for transferring the mushy material collected above the guide plate 30 to the superheater 16 located downstream. The slope of the guide plate is not critical so long as the material received thereby has a tendency to gravitate toward the pump 32. While two guide plates 30 are shown, it will be understood that only one will suffice; also, it is possible to provide a frustroconical guide plate or a plurality of guide plates 30 which define the frustum of a pyramid. As with the preheater, the means of heating the guide plate 30 is not critical and although a fluid heat exchanger is shown, any other means, such as electrical heaters located below the guide plates 30, would also suffice.

The superheater 16, which receives the mush composition forced thereto and therethrough by the pump 32, merely comprises a coiled pipe 34 of sufficiently small cross section to permit the contents to be rapidly and uniformly heated, the coiled pipe 34 being surrounded by a heating medium 36 contained in a suitable housing 38. During its passage through the coiled pipe 34 of the superheater 16, the composition is transformed from the mushy state to a relatively free flowing state in which form it exits from a discharge nozzle 40 which is preferably a spray nozzle.

The material passing through the pump 32 is at such high viscosity that it is not sprayable as such, and more heat must be added, this being accomplished by pumping the material through the superheater 16 wherein the velocity of flow will be high enough to maintain all particles in suspension. The diameter of the pipe 34 is such that increment increases in temperature will be obtained in the system as the material flows therethrough, the temperature reaching that desired at the exit nozzle 40.

It is advantageous in accordance with the present invention to use a single countercurrent fluid heating system for providing heat at various stages of the portable heater 10. This countercurrent fluid heating system, which is preferably a closed circuit, comprises a fluid heater 42, shown schematically, which receives cooled fluid from a pipe 44 and transforms such cooled fluid, such as by the utilization of electrical energy, to a temperature sufficiently high for use in the superheater 16. After being heated in the heater 42, the fluid is passed through a pipe 46 to the superheater 16 where it gives part of its sensible heat to a composition flowing through the pipe 34 thereby heating such composition to the flowable state. The slightly cooled fluid is then passed through a pipe 48 to a space below the guide plate 30, and from there by a pump 50 through a line 52 to the heating means 28 where further sensible heat is lost. The heating fluid is then passed through the return line 44 to the fluid heater 42. Any suitable heating fluid may be used, such as compressed steam, heated oil, "Dowtherm," etc.

While the operation of the device will be quite apparent from the above description, the operation is further described below:

A suitable powdered thermoplastic-aggregate composition suitable for highway traffic lines is fed to the hoppers 18 through the openings 22. At the discharge end of the hopper the control orifice so controls the flow that the desired end temperature on the order of 260° F. is obtained, although different plastic materials will require somewhat varying discharge temperatures to prevent the aggregate from settling. The preheater 12 gives continuous contact between the heating surface and the plastic material. Thus, that portion of the contents of the hoppers 18 contacting the heating means 28 is reduced to a mushy consistency and drops through the control orifice 24 by gravity to guide plate 30.

This mushy composition is then guided into the suction end of the pump 32 which forces the material through the superheater 16 thereby raising its temperature from 260° F. to 400—450 F. depending on the temperature necessary for end use. At this temperature the composition is reduced to a relatively free-flowing state so that it may be sprayed by the spray nozzle 40 at the discharge end of the superheater.

As is apparent from the above description, two stages of heating are necessary in the present invention since it has been determined that settling of the aggregate occurs at a temperature of 320° F. which is well below the sprayable temperature of from 400—450° F. The only way to prevent settling of aggregate at the elevated temperature would be agitation and this is undesirable for the reasons pointed out above. The portable melter 10 solves this problem by heating in two stages, the first of which is sufficiently low so that settling does not occur, and the second of which is sufficiently fast so that settling does not occur.

Such a melter mounted on a truck and provided with dispensing or spraying guns constitutes a highway striping machine capable of continuous operation for a given period of time, and eliminates the down time now required for conventional melters now commonly in use. The use of pressurized vessels and reservoirs of hot material are eliminated by the present invention, giving safety in loading and operation since the only real reservoir of molten material is that which is passing through the superheater.

An illustrative example of the apparatus in use follows:

A mixture of 16 parts of colophony resin, 4 parts of mineral oil, 60 parts of graded washed white sand, 10 parts of very fine chalk and 10 parts of titanium dioxide are fed through the preheater 12, the film temperature adjacent the heating means 28 being maintained at 280—290° F. The material in mush form is passed to the superheater by the pump 32 where the temperature of the composition is raised to 420° F. at the exit very quickly, the mixture being sprayable at such a later temperature.

As pointed out above, various compositions may be melted in the present device such as bitumen, Trinidad asphalt reduced to suitable size, rubberized bitumen, colored surfacing materials such as "PAVEBRITE" and road marking thermoplastics. As an example of a black surfacing composition, a mixture of crushed asphalt with chippings may be fed to the melter. As an expansion joint filler, a subdivided bitumen containing an elastomer may be used.

The foregoing description of the specific embodiments will so fully reveal the general nature of the invention that others can, by applying current knowledge, readily modify such specific embodiments and/or adapt them for various applications without departing from the generic concept, and, therefore, such adaptations and modifications should and are intended to be comprehended within the meaning and range of equivalents.

I claim:

1. A portable plastic melter for the treatment of a mixture of particles of a thermoplastic material and an aggregate material for reducing the plastic to a flowable condition while maintaining the aggregate uniformly dispersed in the flowable plastic comprising:

means for receiving said particulate and for discharging said mixture at the bottom thereof in a mushy state, said means comprising a vertically aligned preheater hopper having a downwardly sloping sidewall defining a large opening at the top for receiving said particulate mixture and a small opening at the bottom thereof for discharging said mixture in a mushy state, and means within said hopper to apply heat along a generally vertical surface to the contents of said hopper to reduce said contents to a mushy state;

a downwardly sloped guide plate located beneath the bottom small opening of said preheater hopper and adapted to receive the mushy composition falling therefrom, and means to heat said guide plate;

pump means at the lower end of said guide plate for removing the mushy composition;

a superheater to which said pump means forces the composition, said pump means quickly forcing the composition through said superheater where the plastic is heated substantially and reduced to a free-flowing state;

a discharge spray nozzle for the melted composition exciting from said superheater; and a countercurrent fluid heating means including a fluid heater, means for carrying the fluid from said fluid heater through said superheater to heat said superheater, means for carrying said heating fluid from said superheater to below and in heat-exchange relationship with said guide plate to comprise said guide plate heating means, means to carry said heating fluid from said guide plate to said preheating hopper to comprise said hopper heating means, and means to pass said fluid back to said fluid heater.

2. A device in accordance with claim 1 wherein said superheater comprises a coiled pipe for carrying said composition, said pipe being surrounded by a heating fluid.

3. A device in accordance with claim 1 wherein a plurality of said preheater hoppers are provided in parallel, each overlying said guide plate; and wherein two said guide plates are provided in facing relationship.

4. A device in accordance with claim 3 wherein said heating means for each said preheater hopper comprises a heating coil passing through the center thereof of each said hopper.

5. A device in accordance with claim 1 wherein the sloping sidewall of said hopper is disposed at an angle to the vertical of 10—30°.

6. A device in accordance with claim 5 wherein said preheater hopper comprises two oppositely facing sloping sidewalls and two parallel end walls.

7. A device in accordance with claim 5 wherein said preheater hopper comprises a frustoconical sidewall.

8. A device in accordance with claim 6 wherein said preheater hopper comprises a plurality of said sloping walls defining the frustum of a pyramid.